(12) United States Patent
Joshi et al.

(10) Patent No.: US 9,740,214 B2
(45) Date of Patent: Aug. 22, 2017

(54) NONLINEAR MODEL PREDICTIVE CONTROL FOR CHEMICAL LOOPING PROCESS

(71) Applicant: ALSTOM Technology Ltd, Baden (CH)

(72) Inventors: Abhinaya Joshi, Glastonbury, CT (US); Hao Lei, Mason, OH (US); Xinsheng Lou, West Hartford, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 992 days.

(21) Appl. No.: 13/946,115

(22) Filed: Jul. 19, 2013

(65) Prior Publication Data

US 2014/0025210 A1    Jan. 23, 2014

Related U.S. Application Data

(60) Provisional application No. 61/674,659, filed on Jul. 23, 2012.

(51) Int. Cl.
*G05D 7/06* (2006.01)
*G05B 13/04* (2006.01)
*G05B 17/02* (2006.01)

(52) U.S. Cl.
CPC .......... *G05D 7/0617* (2013.01); *G05B 13/042* (2013.01); *G05B 17/02* (2013.01)

(58) Field of Classification Search
CPC ..... G05D 7/0617; G05B 13/042; G05B 17/02
See application file for complete search history.

(56) References Cited

U.S. PATENT DOCUMENTS 1,897,725 A    2/1933    Gaus et al.
2,878,099 A    3/1959    Breuing et al.
(Continued)

FOREIGN PATENT DOCUMENTS

CA    2767073 A1    1/2011
CA    2799133 A1    12/2011
(Continued)

OTHER PUBLICATIONS

S. Maley, R. Romanosky; "Plant Process Control Workshop" U.S. Department of Energy, National Energy Technology Laboratory, Mar. 22, 2006 (Mar. 22, 2006) XP-002532105; p. 18-25, p. 51-52.
(Continued)

*Primary Examiner* — Charles Kasenge
(74) *Attorney, Agent, or Firm* — GE Global Patent Operation; Stephen G. Midgley

(57) ABSTRACT

A control system for optimizing a chemical looping ("CL") plant includes a reduced order mathematical model ("ROM") that is designed by eliminating mathematical terms that have minimal effect on the outcome. A non-linear optimizer provides various inputs to the ROM and monitors the outputs to determine the optimum inputs that are then provided to the CL plant. An estimator estimates the values of various internal state variables of the CL plant. The system has one structure adapted to control a CL plant that only provides pressure measurements in the CL loops A and B, a second structure adapted to a CL plant that provides pressure measurements and solid levels in both loops A, and B, and a third structure adapted to control a CL plant that provides full information on internal state variables. A final structure provides a neural network NMPC controller to control operation of loops A and B.

5 Claims, 9 Drawing Sheets

(56) References Cited

U.S. PATENT DOCUMENTS

| | | | |
|---|---|---|---|
| 2,889,197 A | 6/1959 | Baumann | |
| 4,354,468 A | 10/1982 | Sone et al. | |
| 4,847,057 A | 7/1989 | Brugerolle et al. | |
| 5,347,954 A | 9/1994 | Dietz | |
| 5,414,619 A | 5/1995 | Katayama et al. | |
| 5,447,024 A | 9/1995 | Ishida et al. | |
| 5,740,033 A * | 4/1998 | Wassick | G05B 13/048 700/29 |
| 5,762,008 A | 6/1998 | Martin et al. | |
| 5,806,052 A | 9/1998 | Bonissone et al. | |
| 6,056,781 A * | 5/2000 | Wassick | G05B 13/048 700/28 |
| 6,222,164 B1 | 4/2001 | Stoddard et al. | |
| 6,408,227 B1 | 6/2002 | Singhvi et al. | |
| 6,682,669 B2 * | 1/2004 | Bulgrin | B29C 45/76 264/40.1 |
| 7,083,658 B2 | 8/2006 | Andrus, Jr. et al. | |
| 7,133,784 B2 | 11/2006 | Vaidyanathan et al. | |
| 7,533,620 B2 | 5/2009 | Morin et al. | |
| 7,824,574 B2 | 11/2010 | White et al. | |
| 8,160,730 B2 | 4/2012 | Lou | |
| 2003/0080452 A1 * | 5/2003 | Bulgrin | B29C 45/76 264/40.1 |
| 2004/0133363 A1 | 7/2004 | Vaidyanathan et al. | |
| 2004/0237404 A1 | 12/2004 | Andrus et al. | |
| 2005/0075993 A1 | 4/2005 | Jang et al. | |
| 2005/0175533 A1 | 8/2005 | Thomas et al. | |
| 2006/0096175 A1 | 5/2006 | Russell et al. | |
| 2006/0100721 A1 | 5/2006 | Piche | |
| 2006/0130719 A1 | 6/2006 | Morin et al. | |
| 2007/0049489 A1 | 3/2007 | Becue et al. | |
| 2007/0078533 A1 | 4/2007 | Caldwell | |
| 2007/0142975 A1 | 6/2007 | Piche | |
| 2007/0250215 A1 | 10/2007 | Jia et al. | |
| 2008/0109100 A1 * | 5/2008 | Macharia | C10L 1/02 700/110 |
| 2008/0164443 A1 | 7/2008 | White et al. | |
| 2009/0000194 A1 | 1/2009 | Fan et al. | |
| 2009/0222108 A1 | 9/2009 | Lou | |
| 2009/0222136 A1 | 9/2009 | Lou | |
| 2009/0287320 A1 * | 11/2009 | MacGregor | G05B 17/02 700/29 |
| 2010/0050654 A1 | 3/2010 | Chiu et al. | |
| 2011/0190939 A1 | 8/2011 | Lou et al. | |
| 2012/0004755 A1 * | 1/2012 | Noll | C12M 21/12 700/104 |
| 2012/0148484 A1 | 6/2012 | Gauthier et al. | |
| 2013/0118957 A1 | 5/2013 | Hoteit et al. | |
| 2013/0149650 A1 | 6/2013 | Gauthier et al. | |

FOREIGN PATENT DOCUMENTS

| | | |
|---|---|---|
| CA | 2799139 A1 | 12/2011 |
| CN | 101610831 A | 12/2009 |
| DE | 469840 C | 12/1928 |
| EP | 0193677 A2 | 9/1986 |
| EP | 0634470 A1 | 1/1995 |
| GB | 2 350 695 | 12/2000 |
| GB | 2 440 674 | 2/2008 |
| JP | 62293401 A | 12/1987 |
| JP | 028903 A | 1/1990 |
| JP | 04203708 A | 7/1992 |
| JP | 04268601 A | 9/1992 |
| JP | H05265509 A | 10/1993 |
| JP | 0749702 A | 2/1995 |
| JP | 0770569 A | 3/1995 |
| JP | 0778001 A | 3/1995 |
| JP | 0791612 A | 4/1995 |
| JP | 08339204 A | 12/1996 |
| JP | 09242507 A | 9/1997 |
| JP | 10141617 A | 5/1998 |
| JP | 11182209 A | 7/1999 |
| JP | 2000097001 A | 4/2000 |
| JP | 2000197480 A | 7/2000 |
| JP | 2000337168 A | 12/2000 |
| JP | 2001234204 A | 8/2001 |
| JP | 2001346333 A | 12/2001 |
| JP | 2002215205 A | 7/2002 |
| JP | 2003-323201 | 11/2003 |
| JP | 2004316938 A | 11/2004 |
| JP | 2005-176495 | 6/2005 |
| JP | 2005188807 A | 7/2005 |
| JP | 2006178626 A | 7/2006 |
| JP | 2007271187 A | 10/2007 |
| JP | 2007272361 A | 10/2007 |
| JP | 2011513861 A | 4/2011 |
| WO | 2008027246 A2 | 3/2008 |

OTHER PUBLICATIONS

A.G. Abilov, Z. Zeybek, O. Tuzunalp, Z. Telatar: "Fuzzy Temerature Contol of Industrial Refineries Furnaces Through Combined Feedforward/Feedback Multivariable Cascade Systems" Chemical Engineering and Processing 41, Jan. 5, 2001 (Jan. 5, 2001), XP002532106 the whole document.

Tiejun Zhang et al: "Terminal Cost Constraint based Stable Fuzzy Model Predictive Control of a Nonlinear Fluidized Bed Combustion Plant" Intelligent Control, 2007. ISIC 2007. IEEE 22nd International Symposium on, IEEE, PI, Oct. 1, 2007 (Oct. 1, 2007), pp. 401-406, XP301230209, ISBN: 978-1-4244-0440-7 abstract p. 401.

Susan M. Maley and Robert R. Romanosky; "Stakeholder Workshop. Advanced Process Control for Next Generation Power Plants. Summary Report" Internet Citation, [Online] Jul. 1, 2007 (Jul. 1, 2007), p. 78pp, XP009121863.

Xinsheng Lou et al.: "Simulation and Advanced Controls for Hybrid Combustion-Gasification Chemical Looping Process" 18th Annual Joint ISA POWID/EPRI Controls and 51st ISA POWID Symposia 2008; Jun. 8-13, 2008, Scottsdale, Arizona, USA,, vol. 475, Jun. 8, 2008 (Jun. 8, 2008), pp. 326-337, XP009118467, ISBN: 978-1-60560-410-7.

The Society of Instrument and Control Engineers "Neuro-Fuzzy A.I. Handbook", 3 Pages, May 25, 1994.

Yeh et al., "Semi-Batch Absorption and Regeneration Studies for CO2 Capture by Aqueous Ammonia", Fuel Processing Technology, vol. 86, pp. 1533-1546, 2005.

Figueroa et al., "Advances in CO2 Capture Technology—The U.S. Department of Energy's Carbon Sequestration Program", International Journal of Greenhouse Gas Control, vol. 2, Issue No. 1, pp. 9-20, 2008.

US Non-Final Office Action issued in connection with related U.S. Appl. No. 12/394,654 on Sep. 26, 2011.

Unofficial English translation of Japanese Office Action issued in connection with related JP Application No. 2010-549778 on May 29, 2012.

Unofficial English translation of Japanese Office Action issued in connection with related JP Application No. 2010-549779 on May 29, 2012.

Unofficial English translation of Japanese Office Action issued in connection with related JP Application No. 2010-549780 on May 29, 2012.

Unofficial English translation of Chinese Office Action and Search Report issued in connection with related CN Application No. 200980108364.9 on Jul. 13, 2012.

US Final Office Action issued in connection with related U.S. Appl. No. 12/394,654 on Aug. 2, 2012.

Unofficial English translation of Japanese Office Action issued in connection with related JP Application No. 2010-549780 on Apr. 23, 2013.

Unofficial English translation of Japanese Office Action issued in connection with related JP Application No. 2012-551310 on Aug. 6, 2013.

Unofficial English translation of Japanese Office Action issued in connection with related JP Application No. 2010-549778 on Nov. 11, 2013.

(56) References Cited

OTHER PUBLICATIONS

Unofficial English translation of Japanese Office Action issued in connection with related JP Application No. 2010-549779 on Dec. 2, 2013.
Unofficial English translation of Japanese Notice of Allowance issued in connection with related JP Application No. 2010-549780 on Jan. 6, 2014.
US Non-Final Office Action issued in connection with related U.S. Appl. No. 12/394,654 on Apr. 11, 2014.
Unofficial English translation of Japanese Office Action issued in connection with related JP Application No. 2012-551310 on May 7, 2014.
European Office Action issued in connection with related EP Application No. 09719932.7 on Jun. 24, 2014.
Unofficial English translation of Japanese Office Action issued in connection with related JP Application No. 2010-549778 on Jul. 22, 2014.
Unofficial English translation of Japanese Office Action issued in connection with related JP Application No. 2010-549779 on Jul. 22, 2014.
Unofficial English translation of Japanese Notice of Allowance issued in connection with related JP Application No. 2012-551310 on Nov. 17, 2014.
Unofficial English translation of Japanese Office Action issued in connection with related JP Application No. 2010-549779 on Aug. 3, 2015.
Unofficial English translation of Japanese Office Action issued in connection with related JP Application No. 2014-182317 on Oct. 13, 2015.
Unofficial English translation of Japanese Notice of Allowance issued in connection with related JP Application No. 2014-182317 on Apr. 19, 2016.
Wikipedia, "Chemical looping combustion" version dated Sep. 21, 2011 retrieved from https://en.wikipedia.org/w/index.php?title=Chemical_looping_combustion&oldid=451698320 on Jun. 30, 2016; 3 pages.

* cited by examiner

NONLINEAR MODEL PREDICTIVE CONTROL FOR CHEMICAL LOOPING PROCESS

CROSS-REFERENCE TO RELATED APPLICATIONS

This application claims the benefit of priority filing of U.S. Provisional Application Ser. No. 61/674,659, entitled "Nonliner Model Predictive Control for Chemical Looping Process." Filed Jul. 23, 2012, the entire disclosure of which is hereby incorporated by reference.

The present invention is related to issued U.S. Pat. No. 8,160,730 "Fuzzy Logic Control and Optimization System" by Xinsheng Lou, issued Apr. 17, 2012;

U.S. Patent application Publication No. 2011/0190939 "Control and Optimization System and Method for Chemical Looping Processes", by Xinsheng Lou, Abhinaya Joshi, Hao Lei published Aug. 4, 2011;

U.S. Patent application Publication No. 2009/0222136 "Control and Optimization System", by Xinsheng Lou, published Sep. 3, 2009;

U.S. Patent application Publication No. 2009/0222108 "Integrated Controls Design Optimization" by Xinsheng Lou, published Sep. 3, 2009, all of which are incorporated by reference in their entirety.

STATEMENT REGARDING FEDERALLY SPONSORED RESEARCH OR DEVELOPMENT

The United States Government has certain rights in this invention pursuant to Department of Energy Contract No. DE-FC26-07 NT 43095.

TECHNICAL FIELD

The present invention relates to a control optimization system for a chemical looping process, and more specifically to a control optimization system for a chemical looping process employing a nonlinear model predictive controller.

BACKGROUND

The Chemical Looping Process

A typical chemical looping (CL) system utilizes a high temperature process, whereby solids such as calcium- or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal, for example. After a reduction reaction in the reducer, the solids, no longer having the captured oxygen, are returned to the oxidizer to be oxidized again, and the cycle repeats.

Depending on a ratio of the fuel to the air, different gases are produced in the oxidation and reduction reactions. As a result, the ratio of fuel to air can be controlled such that the CL system may be utilized in different ways, such as: as a hybrid combustion-gasification process which produces hydrogen for gas turbines, fuel cells and/or other hydrogen-based applications; as a hybrid combustion-gasification process which produces a synthesis gas (syngas) containing varying amounts of hydrogen and carbon dioxide for gas turbines and/or fuel cells; or as a combustion process for a combustion-based steam power plant.

The CL process is more complicated than processes of traditional plants such as conventional circulating fluidized bed (CFB) plants, for example. As a result, traditional plant controls applied to the CL process necessarily result in separate control loops for each CL loop. However, using separate control loops for each CL loop is inefficient and does not optimize performance of the CL process, since accurate control depends on coordinated control of multiple parameters in each loop, and parameters which crossover between loops.

In addition, the CL process has multi-phase flows and chemical reactions which are characterized by process non-linearities and time delays due to mass transport and chemical reaction rates. As a result, traditional power plant design without considering control optimization systems in early stages of process design are further inadequate for integrated optimization of process performance and system operability.

Further, many of the variables in the CL process have nonlinear relationships with other variables, e.g., inter-loop interaction of variables. As a result, process models need to be developed so as to effectively characterize these multi-interdependent variable relationships.

Chemical looping technology is a method of heat production that can produce a separate stream of $CO_2$ that can be sequestered, reducing the exhaust of greenhouse gases. This concept is based on a process utilizing high temperature chemical and thermal looping technology. As studied in previous projects, the chemical looping plant was assessed very favorably in terms of capital cost and electricity cost with up to 95% $CO_2$ capture. However, due to the inherent nonlinearity of the process and the multi-loop interactions of solid particles, it is a quite challenging problem to control the particle flows and stabilize the reactants (solids) transport in the loops such that the system can sustain desired chemical reactions and provide stable energy production.

Nonlinear Model Predictive Control

In order to achieve the goals of stability and maximum profitability for the chemical looping process, the design of advanced process control becomes one of the important components in the development of this technology. Model predictive control ("MPC") is an advanced method of model based process control. It is a multivariable control algorithm that uses an internal dynamic model of the process and an optimization solver to calculate the optimum control moves. MPC schemes that are based on nonlinear models and consider linear or non-linear cost-functions and general nonlinear constraints on the state and input variables are considered nonlinear model predictive control (NMPC). Nonlinear model predictive control (NMPC) is presented schematically in FIG. 1.

Values are provided for input variables (or manipulated variables) to a plant 1, that is intended to be controlled. The plant 1 produces outputs that are fed to a NMPC 100 that includes an internal nonlinear model 120 that is defined by non-linear equations between at least one input and at least one output.

Nonlinear model 120 is a mathematical model of various processes of plant 1 that provide outputs similar to plant 1 when each are supplied with the same inputs.

NMPC 100 also includes a nonlinear optimizer 130. The nonlinear optimizer 130 receives input constraint ranges and at least one goal. Nonlinear optimizer 130 provides input values within the constraint range to the nonlinear model 120 which creates outputs. Nonlinear optimizer 130 monitors and stores the outputs of the nonlinear model 120. Nonlinear optimizer 130 repeats this process for a plurality of input variable values spanning the constraint range while monitoring and storing the outputs. It then analyzes the outputs and goals to determine an optimum output and the inputs associated with the optimum output.

An estimator 110 interacts with nonlinear model 120 to estimate the values of internal state variables for given input and output variables.

To develop an NMPC a mathematical model of the chemical looping system must be designed which accurately depicts the functioning of the chemical looping system and its control structures.

Usually these models solve non-linear problems, and are therefore are computationally demanding due to the large number of computations required for each output calculation. Therefore, to be practical, there must be a way to use the model to arrive at estimated output quickly.

It is important to consider costs of running a chemical looping plant. Therefore, one of the control goals should include optimization of operating costs instead of simply optimizing operation. Therefore, there is currently a need for a controller for a chemical looping process that can stabilize its operation and minimize its operating costs.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein is an integrated process design and control optimization system for a chemical looping (CL) system of a CL plant, similar to that described in greater detail in U.S. Pat. No. 7,083,658, which is incorporated herein by reference in its entirety.

Figure 1:
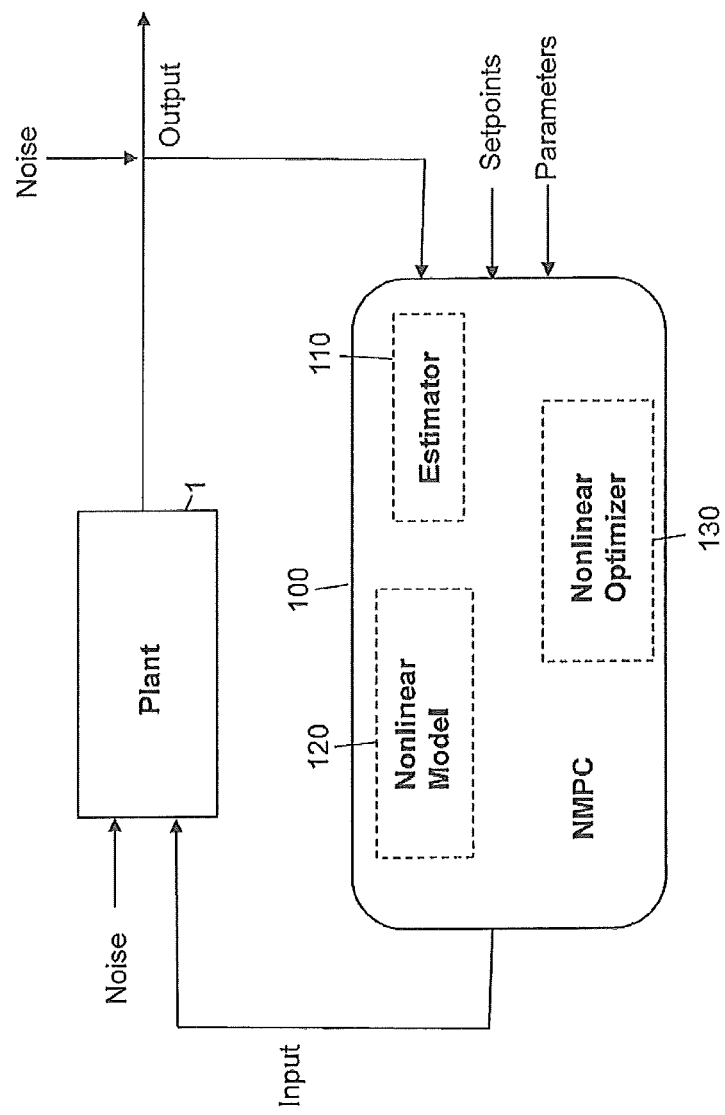
FIG. 1 is a general schematic diagram of a non-linear predictive controller.
Figure 2:
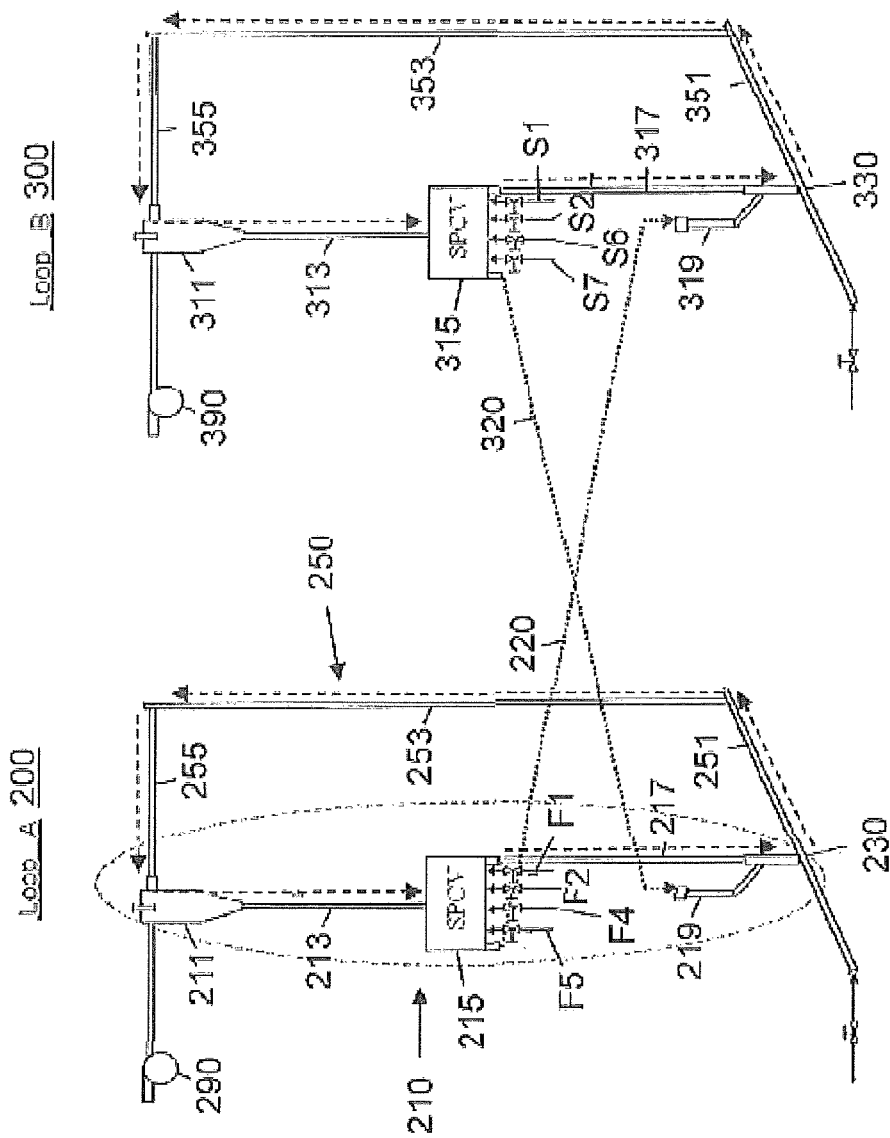
FIG. 2 is schematic illustration of a chemical looping system that is compatible with present invention.

Referring now to the drawings, and more particularly to FIG. 2, a chemical looping system that is compatible with present invention is shown.

The CL process involves multi-phase flows and chemical reactions characterized by process nonlinearities and time delays due to mass transport rates and chemical reaction rates. Thus, as will be described in greater detail below, nonlinear optimization and control techniques are beneficial for controlling the CL process. Specifically, an exemplary embodiment includes nonlinear dynamic chemical looping modeling and simulation derived from first principle equations (mass, momentum, energy, and chemical species balances, for example). The modeling and simulation includes any combination of ordinary differential equations ("ODEs"), algebraic equations ("AEs"), and partial differential equations ("PDEs").

The chemical looping system has a first loop, loop A (200) and a second loop, loop B (300). Loop A has a crossover pipe 220 that passes particulate matter from loop A to loop B. Similarly, a crossover pipe 320 carries particulate material from loop B to loop A.

Pulverized and/or crushed carbonaceous fuel, such as coal, is provided into inlet pipe 219 of loop A.

This mixes with the particulate material falling down return leg 217, and is blown up lower pipeline 251, riser 253 and upper pipeline 255 to be received by a gas/particle separator, shown here as a cyclone 211.

Gases pass out of the top of cyclone 211, while particulate matter is passed through dip leg 213 to a seal pot 215. Seal pot 215 has several input valves that are remotely activated by signals F1, F2, F4 and F5 to blow a specified amount of particulate matter from the seal pot into either the return leg 217 or crossover pipe 220 to loop B.

Similarly, loop B has similar parts that function in the same manner. Seal pot 315 has several input valves that are remotely activated by signals S1, S2, S6 and S7 to blow a specified amount of particulate matter from the seal pot 315 into either the return leg 317 or crossover pipe 320 to loop A.

By adjusting the amount of oxygen and fuel in each loop, chemical carriers are oxidized in loop A and are reduced in loop B.

Since the carriers only carry oxygen, the fuel is oxidized to create $CO_2$ and $H_2O$ that are separated to result in $CO_2$ for sequestration. This is the process that is to be controlled with the NMPC.

Figure 3:
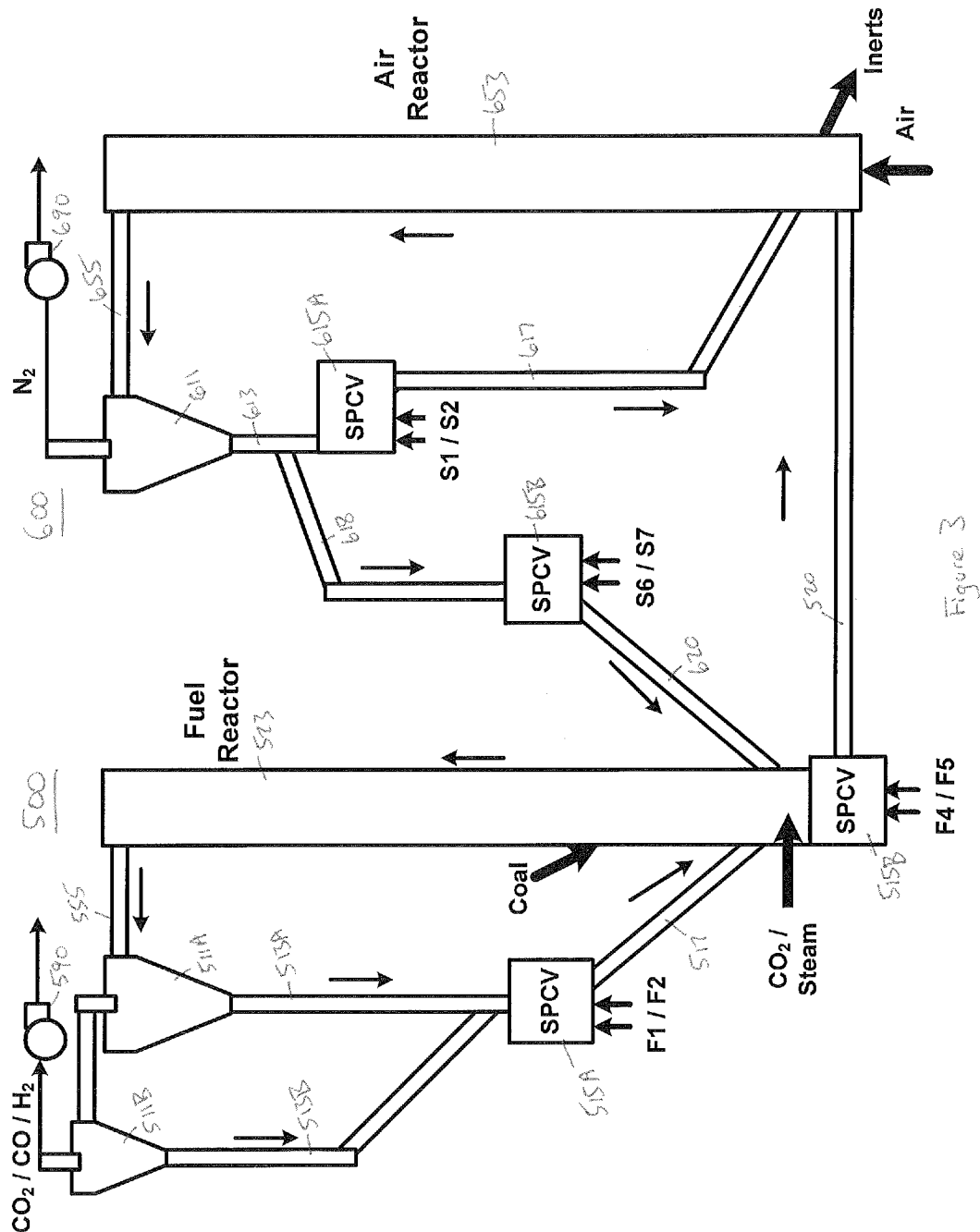
FIG. 3 is schematic illustration of another embodiment of chemical looping system that is also compatible with present invention.

FIG. 3 provides an alternative embodiment of a chemical looping system. FIG. 3 provides two reactor loops, fuel reactor loop 500 and air reactor loop 600. The labels in the 500 and 600 series provided in this Figure generally corresponding in function to the labels provided in the 200 and 300 series of FIG. 2. Particulate matter, also known as solids or reactants, circulate within each loop and pass from one loop to another. The particulate matter that is ejected out of seal pots are transported up the reactors by the use of a transport air or gas supplied at or near the bottom of reactors.

In the fuel reactor loop 500, the particulate matter passes through a pipe 555 and is separated in cyclones 511A and 511B and collected in a seal pot 515A via a primary dip leg 513A operably associated with the cyclone 511A, and secondary dip leg 513B operably associated with the cyclone 511B. The particulate matter then passes from seal pot 515A through a return leg 517 to a fuel reactor 523. Seal pot 515A has input valves that are remotely activated by signals F1 and F2 to blow a specified amount of particulate matter from the seal pot 515A to the fuel reactor 523. Seal pot 515B has input valves that are remotely activated by signals F4 and F5 to blow a specified amount of particulate matter from the seal pot 515B to the fuel reactor and air reactor 653.

In the air reactor loop 600, the particulate matter passes through a pipe 655 and is separated in a cyclone 611 before being collected in dip leg 613 and separated into seal pot 615A and 615B. Seal pot 615A has several input valves that are remotely activated by signals S1, S2, to blow a specified amount of particulate matter from the seal pot 615A into the return leg 617. Seal pot 615B has several input valves that are remotely activated by signals S6 and S7 to blow a specified amount of particulate matter from seal pot 615B through the crossover pipe 620 into fuel reactor 523.

Pressure control device 590, 690, such as a vacuum pump or an induced draft fan, regulates the pressure of the fuel reactor loop and air reactor loop, respectively. As similarly discussed herein in relation to FIGS. 2 and 4, NMPC 100 provides a signal (Pump A) to actuate pressure control device 590 regulating pressure (P2) of the fuel reactor loop 500. Likewise, NMPC 100 provides a signal (Pump B) to actuate a pressure control device 690 regulating pressure (P2b) of the air reactor loop 600 loop B.

In comparison to FIG. 2, the chemical looping system in FIG. 3 does not utilize a lower pipeline 251 as shown in FIG. 2, as the particulate matter from seal pots 515A and 615A drop directly to reactors 523 and 653, respectively. Further, the fuel reactor loop 500 provides two cyclones and associated dip legs and two separate seal pots 515A and 515B. The air reactor loop 600 provides two separate seal pots 615A and 615B.

To apply nonlinear model predictive control to the chemical looping process, such as described in FIGS. 2 and 3, there are several technical problems to be solved. While nonlinear model predictive controls are described below in detail to with the chemical looping embodiment of FIG. 2, the nonlinear model predictive controls can be similarly applied to the chemical looping embodiment of FIG. 3.

Technical Problems to Overcome

1. How to Build a Nonlinear Prediction Model

The process model plays a decisive role in NMPC and developing a good one is a major challenge to widely apply NMPC in the industry.

2. How to Reduce Computational Time

Computational requirements constitute the primary limitation for application of NMPC, since the nonlinear programming tends to be computationally expensive. The success of applying NMPC to chemical looping process requires the calculation time at each control time step should be in minutes.

3. How to Define Control Structure

Due to the multi-loop interactions, the control of chemical looping process is a complicated multiple inputs and multiple outputs control problem. Moreover, because of the lack of measurements on the solid mass flow and the length of solid inventory at the dip leg, how to design the whole control structure to take advantage of NMPC is an unsolved problem.

4. How to Design Cost Function and Identify Constraints

NMPC is a nonlinear optimization based control strategy and it can give the next optimum control move based on the constraints and the cost function. How to design the cost function that includes both the direct cost, e.g., the cost of fuel and power, and the indirect cost, e.g., the control performance, determines the benefit of applying NMPC to chemical looping process.

Possible Solutions

There are two ways to create nonlinear models for NMPC. One is to build an empirical model based upon test data. The other is to construct the first principle model by using mass balance, momentum conservation and energy balance, as well as chemical species balance.

For the first approach, there are some typical nonlinear model identification techniques, e.g., neural network. While for the second approach, the simulation and control team in Alstom has developed a simulator for chemical looping process based on the first principles. This simulator provides a good start point to develop the model for control purposes.

One major problem is that the computational time required to get results from a NMPC is long. This is due to the prediction model for NMPC being too complicated and requiring long calculation time to result at a prediction. However, this can be solved by developing reduced order models (ROM).

Another problem is that the resulting equations to be solved may not converge. Therefore, it may take a long time for optimization software to find a global optimum. While with a big progress in the large-scale computation and optimization in the last decade, the computational time for nonlinear programming is also reduced significantly.

A simplified NMPC solution is to design multiple linearized models based MPC a multiple operating points (e.g. unit load conditions). The whole control strategy will remain nonlinear for the full operating envelope while the controller at each operating point is reduced to linear MPC design.

With a further understanding about the chemical looping process and the coupling between variables in multiple loops, improved design of the cost function and better identification of the constraints for NMPC is possible.

Newly Developed Features

1. An NMPC Applied to Controlling a Chemical Looping Process

Although MPC has been applied to petrochemical and refinery industries, there are still few application examples for NMPC. Moreover, the chemical looping process is a new technology under developing and it is the first time to apply NMPC to this new technology.

2. A Reduced Order Model for Chemical Looping

Comparing existing modeling methods in the literature, the reduced order modeling for two-phase flow proposed in this invention provides an easier way to construct a simple and reliable model for model-based control. Furthermore, with the prediction of the model, it can also be used to optimize the process.

3. Neural Network NMPC for Chemical Looping

Using a Neural Network model for order reduction or model identification provides an alternative solution to NMPC modeling. Further, combining both first principle and empirical modeling would add values to future chemical looping process simulation and controls optimization.

4. The Control Structures of NMPC in Chemical Looping Process

The three different control structures of applying NMPC to chemical looping process are summarized in this invention. These different control structures basically address three different roles of NMPC in controlling chemical looping process.

5. The Design of Cost Optimization (Minimization)

In order to keep the solid inventory balance in the dual loop or multi-loop process, the design of cost function for NMPC should include the ratio of pressure drop. The traditional quadratic cost function may not guarantee the stability of the whole system. In addition, temperatures, pressures, solids flow, and air/gas injections should be included in the design of the cost function to maintain stable reactions and energy production.

Implementation Description
Reduced Order Mathematical Models (ROM)

To design a reduced order mathematical model for NMPC two requirements should be considered. On one hand, the model should be accurate enough to capture the process dynamics and precisely predict the future outputs. On the other hand, it should be simple enough to achieve the real-time controller calculation. In this invention, a simplified first principle model, referred to as a 'reduced order mathematical model' ("ROM") for control purpose is proposed. The details of how to build an ROM for dual loop chemical looping process is described below. In addition, there are a few things to be addressed for this ROM method:

a). This ROM method provides a way to model the relationship between the solid mass flow and the pressure drop according to the air velocity in pipe. This is also one of the key relationships to be used in the control design.

b). This ROM method can significantly reduce the order of complexity of the first principle models. For example, it generally needs four partial differential equations ("PDEs") to describe the dynamics of solid-gas flow in a pipe. While in this ROM method, only one ordinary differential equation ("ODE") is used.

c). This ROM method presents a simple description about the pressure relationships based on the understanding of the chemical looping process, e.g., the relationship between the reference pressure at the interconnection and the pressure drop in riser.

Another alternative to a mathematical ROM is an empirical model (e.g. Neural Network) and other types of nonlinear model structure). This is a viable approach to model order reduction from first principle models, and is described later.

1. Where to Apply NMPC in Chemical Looping Process a) NMPC can be applied to chemical looping process as a supervisory controller, i.e., NMPC does not manipulate process directly, but provides setpoints for subordinate controller, e.g., Linear Model Predictive controller ("LMPC") or Proportional Integral Derivative ("PID") controller. It can be configured as a dynamic Real-time optimizer ("RTO") engine for continuously varying processes.

b) NMPC is applied to chemical looping process as a direct controller to control solids flow in a load change.

As a new technology for the next generation power plant, the chemical looping process is expected to have the ability to fast follow the load demand from the electrical grid. This further requires the control system in chemical looping process has the capability to change the process in a much wide operation range. Under this case, the linear dynamic assumption, which is usually used by the conventional control design, generally does not hold any more suggesting a need for NMPC control. A general view of load change control for the pilot chemical looping process with NMPC is shown in FIG. 4.

Figure 4:
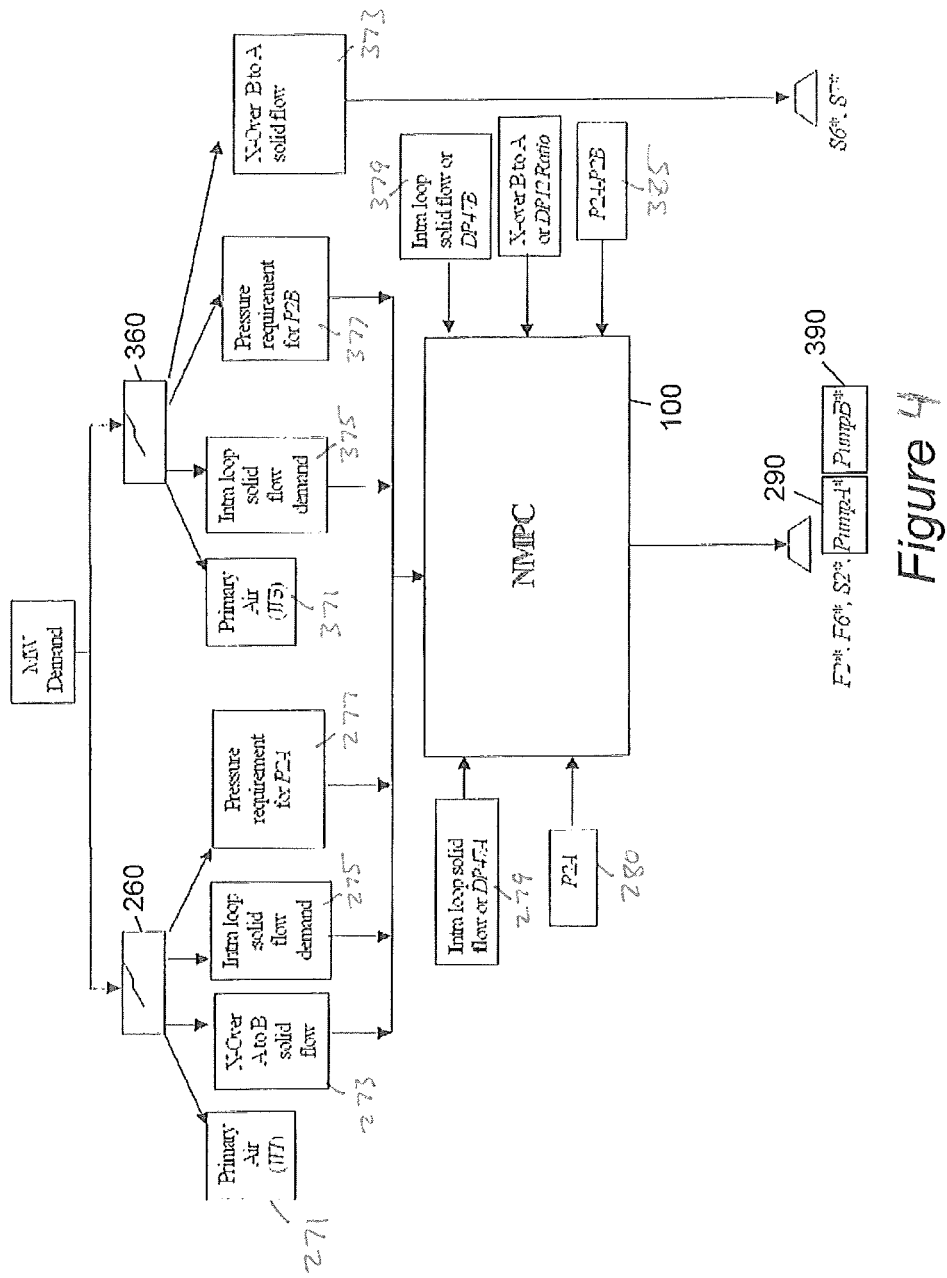
FIG. 4 is schematic illustration of a non-linear model predictive controller (NMPC) controlling a chemical looping system of FIG. 2.

FIG. 4 provides a NMPC control with respect to the chemical looping embodiment of FIG. 2. The NMPC control is also applicable to the chemical looping embodiment of FIG. 3, with similar reference labels performing similar functions. A request for a different megawatt demand is provided to a controller 260 and a controller 360.

Controller 260 estimates primary air/gas (W1) 271, mass moving from loop A to loop B 273, and intra loop solid flow demand for loop A 275, and the pressure required for P2A 277.

Similarly, controller 360 estimates primary air/gas (W3) 371, mass moving from loop B to loop A 373, and intra loop solid flow demand for loop B 375, and the pressure required for P2B 377.

NMPC 100 receives all of the output of controllers 260 and 360, as well as measured inputs intra loop solid flow DP47A for loop A 279, intra loop solid flow DP47B for loop B 379, pressure P2A in loop A 280, pressure difference between the pressures of loops A and B, P2A and P2B 385. The NMPC 100 then actuates the air/gas inlet valve F2 of seal pot 215. Seal pot 215 controls the amount of solids flow through return leg 217 of loop A, and the amount of solid flow form loop A to loop B.

Similarly, NMPC 100 then actuates the air/gas inlet valve S2 of seal pot 315. Seal pot 315 controls the amount of solids flow through return leg 317 of loop B, and the amount of solid flow from loop B to loop A.

Similarly, NMPC 100 provides a signal (Pump A) to actuate vacuum pump (or Induced Draft fan or pressure control device) 290 regulating pressure (P2) of loop A. NMPC 100 provides a signal (Pump B) to actuates vacuum pump (or Induced Draft fan or pressure control device) 390 regulating pressure (P2$b$) of loop B, respectively.

Figure 5:
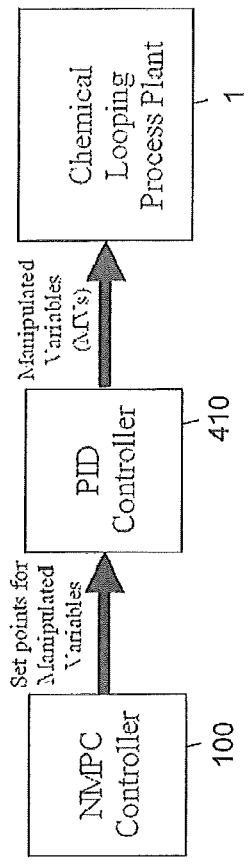
FIG. 5 is a two level cascade control structure employing a nonlinear model predictive controller ("NMPC").

Control Structure with a NMPC Supervisory Controller
Two Level Cascade Control Structure with NMPC FIG. 5 shows a two-level Cascade Control Structure with NMPC. (This will also be explained with reference to FIG. 2.) In this control structure, NMPC 100 is in a supervisory mode. NMPC 100 provides the setpoints for the lower level PID controller 410. While the chemical looping process plant 1 is directly regulated by the PID controller 410 according to the setpoints assigned by NMPC 100.

Three Level Cascade Control Structure with NMPC

Figure 6:
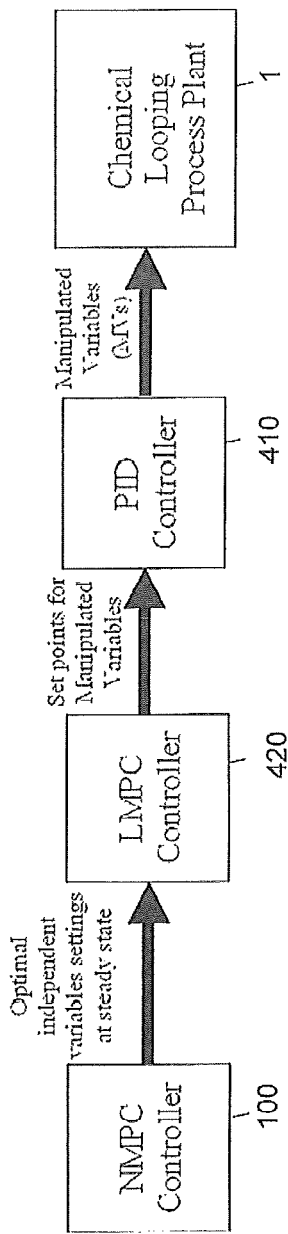
FIG. 6 is a three level cascade control structure employing a nonlinear model predictive controller ("NMPC").

The three level cascade control structure with NMPC 100 is shown in FIG. 6. In this control structure, NMPC 100 plays a role as dynamic real-time optimization (RTO). NMPC 100 calculates the optimal values of independent variables at different operating points against multiple constraints. These values pass to LMPC 420 as the external targets. Then, the lower level controller LMPC 420 determines how to move the set points regarding these external targets and provides the next move of setpoints to PID controller 410. The PID controller 410 directly controls the manipulated variables of the system and regulates the controlled variables of the system to setpoints assigned by LMPC 420.

With different measurements, the NMPC control structure is different. Three typical control structures are identified to control the solid mass flow with different measurements.

Figure 7:
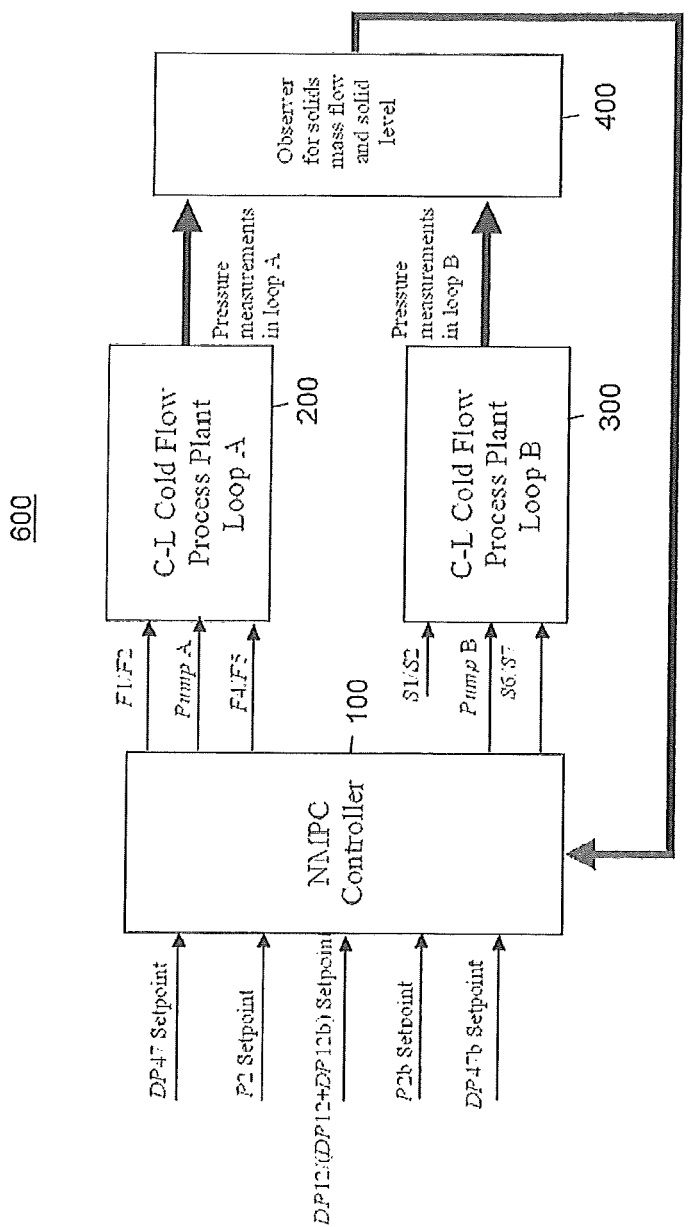
FIG. 7 is a schematic illustration of a NMPC for controlling a chemical looping system for which only pressure measurements are available.

The following description refers to FIG. 7. There are at least 14 state variables in the model used, which includes the pressure, solid mass flow and the solid level. If only the pressure is measurable, in order to implement NMPC, it is necessary to build an observer 400 to estimate the values of the state variables of solids mass flow and solid level. In the control structure shown in FIG. 7, DP12/(DP12+DP12$b$) is a key variable to indicate the solids balance in both loops.

In FIG. 7, an NMPC 100 is employed in a plant for which only pressure measurements for loops A and B are available. NMPC 100 receives desired setpoints:

DP47—differential pressure of riser (loop A)
P2—Pressure of junction (loop A)
DP12/(DP12+DP12$b$)—ratio of pressure drop between the loops A and B
P2$b$—Pressure of junction (loop B)
DP47$b$—differential pressure of riser (loop B)

NMPC 100 calculates values for the following manipulated variables and provides them to loop A:
F1/F2—signal to seal pot valves (loop A)
PumpA—signal to vacuum pump or Induced Draft (ID) fan (loop A)
F4/F5—signal to seal pot valves (loop A).

It also calculates values for the following manipulated variables and provides them to loop B.
S1/S2—signal to seal pot valves (loop B)
S6/S7—signal to seal pot valves (loop B)

An observer 400 measures various pressures in loops A and B and provides the solid mass flow and solid levels back to NMPC 100 to be used in the next calculations.

Figure 8:
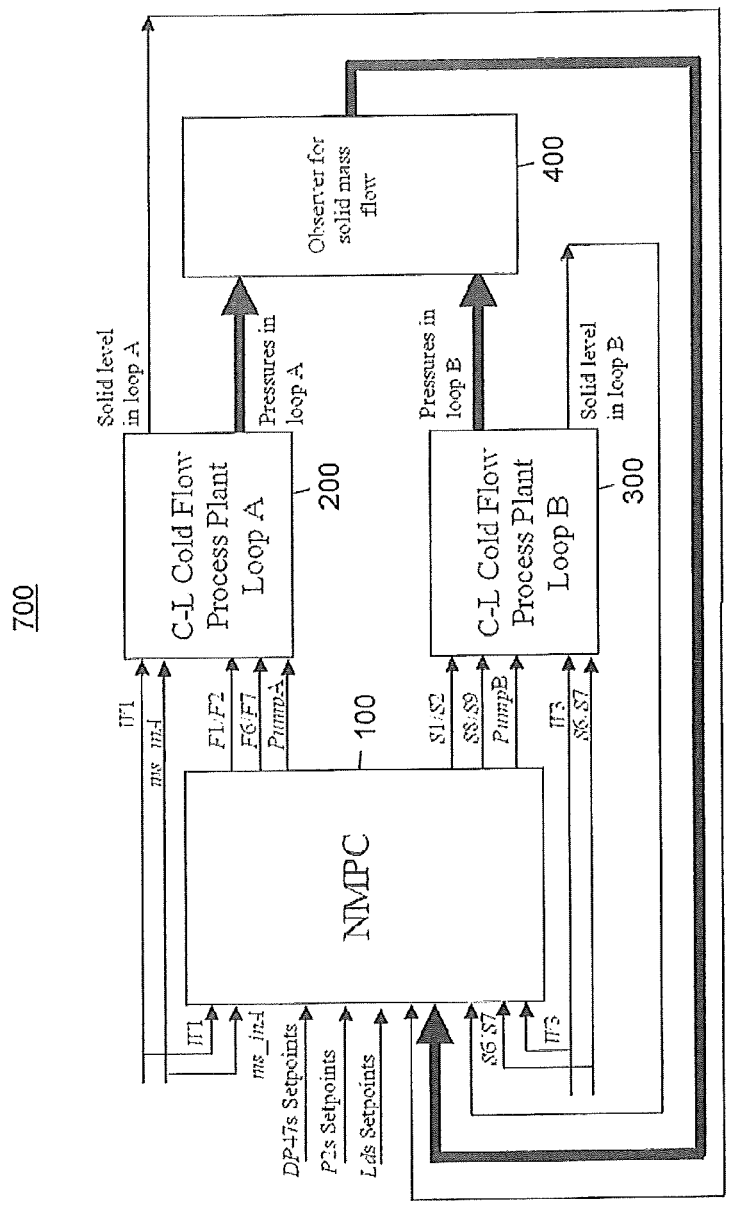
FIG. 8 is a schematic illustration of a NMPC for controlling a chemical looping system for which only pressure measurements and solid levels measurements are available.

Another embodiment of the present invention is shown in FIG. 8. NMPC 100 receives desired setpoints:
DP47—differential pressure of riser (loop A)
P2—Pressure of junction (loop A)
Lds—Dipleg levels
NMPC 100 also receives the variable values for:
W1—Primary Air/Gas (loop A)
ms_inA—mass input (loop A)
S6/S7—signal to seal pot valves (loop B)
W3—Primary Air/Gas (loop B)

NMPC 100 also calculates values for the following manipulated variables and provides them to loop A:
F1/F2—signal to seal pot valves (loop A)
F4/F5—signal to seal pot valves (loop A)
PumpA—signal to vacuum pump ID fan (loop A).
The following inputs are provided directly the loop A:
W1—Primary Air/Gas (loop A)
ms_inA—mass input (loop A)

NMPC 100 also calculates values for the following manipulated variables and provides them to loop B.
S1/S2—signal to seal pot valves (loop B)
S8/S9—signal to seal pot valves (loop B)
PumpB—signal to vacuum pump ID fan (loop B)
W3—Primary Air/Gas (loop B)
S6/S7—signal to seal pot valves (loop B)

An observer 400 measures various pressures in loops A and B and determines solid mass flow and provides this information back to NMPC 100. The solid levels and solid mass flows in loops A and B to be used in the next calculations.

Figure 9:
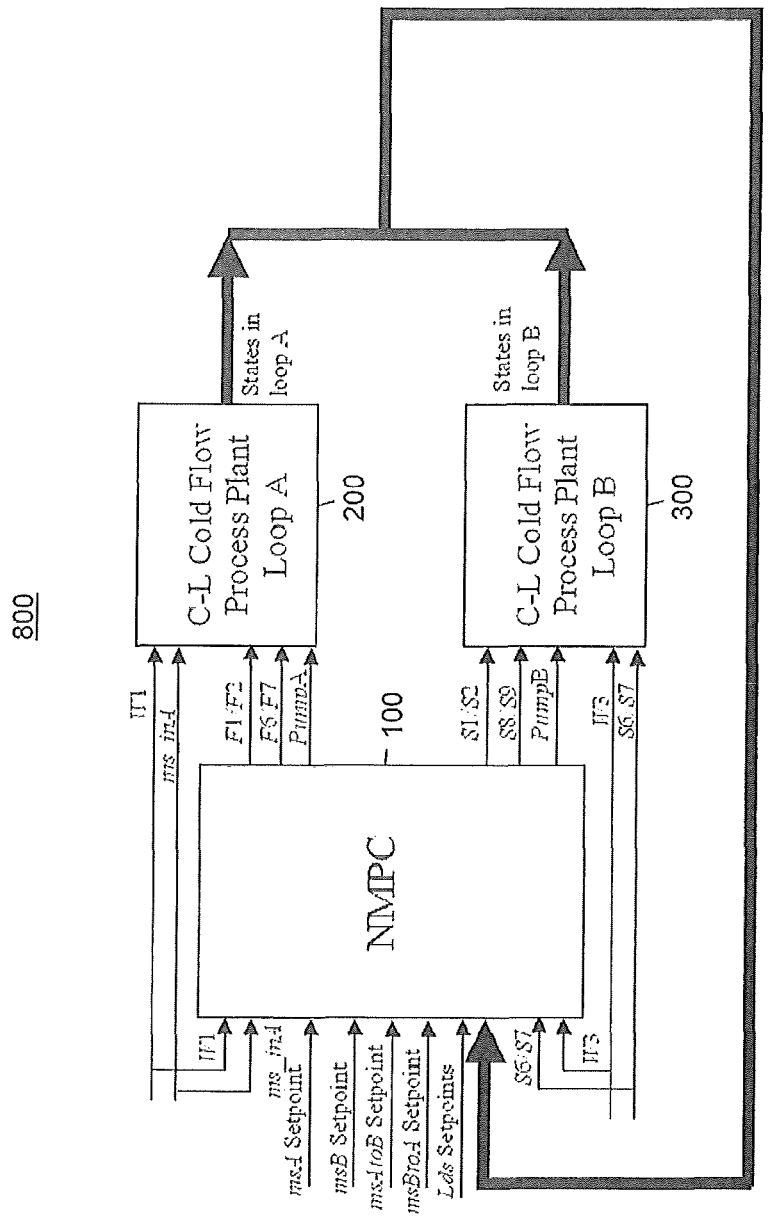
FIG. 9 is a schematic illustration of a NMPC for controlling a chemical looping system for which full measurements are available.

Typical dynamic responses for load change in chemical looping process with NMPC under the full information control structure are shown in FIG. 9. Here loops A 200 and B 300 provide full information of the internal state variables.

Neural Network

Beside the first principle model, as describes and shown up until this point, the empirical model can also be integrated to control the chemical looping process. The neural network is one of the system identification methods for nonlinear systems. An NMPC for chemical looping process with a neural network model is shown in FIG. 10.

Figure 10:
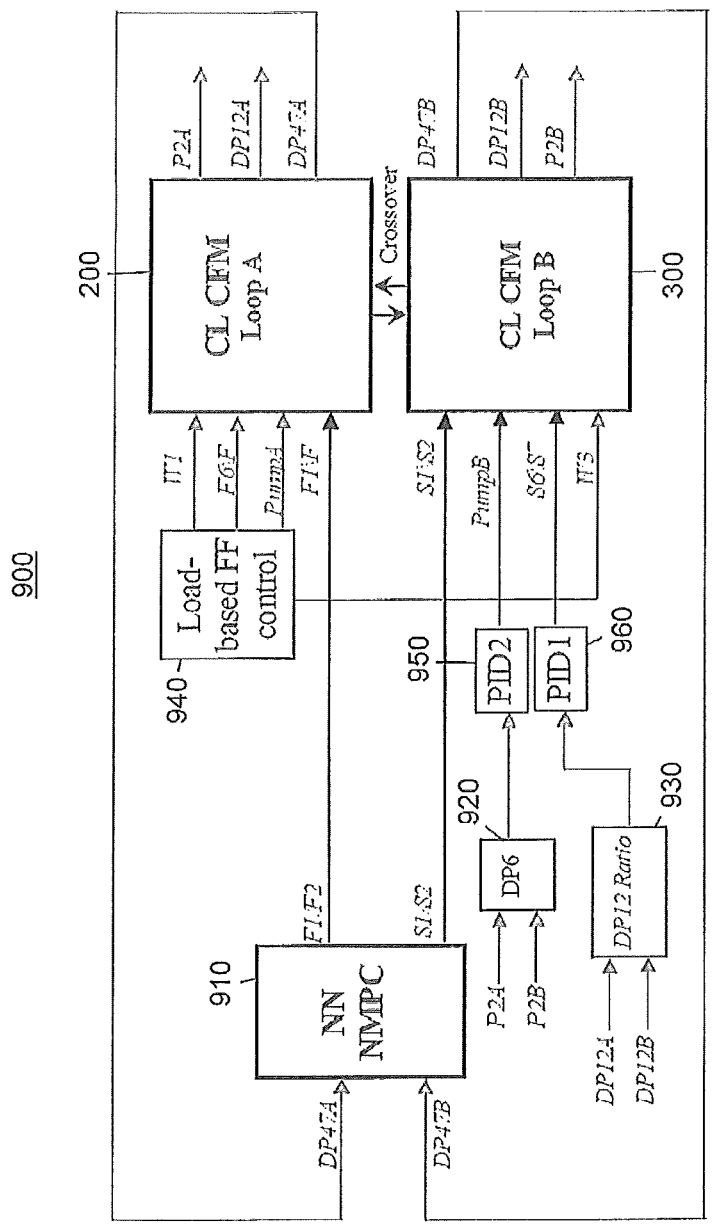
FIG. 10 is a schematic illustration of an NMPC/PID neural network controller for controlling a dual loop chemical looping system.

FIG. 10 is a schematic illustration of an NMPC/PID neural network controller for controlling a dual loop chemical looping system. A neural network non-linear model predictive controller ("NN NMPC") receives as inputs a measure of pressure drops in loop A (DP47A) and in Loop B (DP47B). From these inputs, it provides its pre-programmed outputs to seal pot valves (F1/F2) of loop A and S1/S2 of loop B. A difference device 920 creates a differential pressure signal (DP6) based upon the difference in pressure inputs P2A and P2B and provides signal (DP6) to a proportional integral differentiator (PID2) 950. PID2 950 runs the vacuum pump/ID fan of loop B with a signal (Pump B).

A ratio device 930 receives a pressure drop in loop A (DP12A) and a pressure drop in Loop B (DP12B) and creates a differential pressure signal (DP12 Ratio) that is based upon the ratio of the inputs. Signal (DP12 Ratio) is provided to PID2 950 that operates seal pot valves (S6/S7) of loop B.

A load-based FF controller 940 controls signals (W1), (F4/F5) of loop A, and (W3) of loop B. Loop A provides pressure (P2A), pressure difference (DP12A) and pressure difference (DP47A) to difference device 920, ratio device 930 and NN NMPC 910, respectively, as feedback.

Similarly, loop B provides pressure (P2B), pressure difference (DP12B) and pressure difference (DP47B) to difference device 920, ratio device 930 and NN NMPC 910, respectively, as feedback.

Solid Balance in Dual Loops

Pressure ratio at different parts of chemical looping process should be included in the cost function for control case without level sensors In the control design for chemical looping dual loop process, one of the major control objectives is to balance the solid transport between two loops. However, due to the lack of some of the key measurable variables (e.g., the solid mass flow rate coming out of SPCV and the solid level in the dip leg), the traditional quadratic cost function with measurable variables (e.g., pressure or pressure drop in the system), may not achieve the control objective under this situation. One of the reasons is that although the pressure and the pressure drop are highly related to the solid mass flow rate, they are easily affected by other unknown variables.

However, as observed from the real facility and calculated based on the theoretical analysis, when the chemical looping dual loop process runs in a stable mode, the whole system is in a pressure balance. Therefore, the ratio of pressure drops in different parts of the system should provide a reasonable indication of solids mass flow and dipleg inventory level. As a result, the ratio of pressure drops should be included in the cost function to keep the stability of the whole system.

Reduced Order Mathematical Models for Pipeline in Part I
Nomenclature Used

| | |
|---|---|
| A | Area |
| V | Volume |
| g | The acceleration of the gravity |
| $m_s$ | Solid mass flow rate |
| $\Delta P$ | Pressure drop |
| L | The length |
| $\alpha$ | Coefficient in the friction |
| $\tau$ | Characteristic time in the pipe |
| P | Pressure |
| $\rho_g$ | Gas density |
| $\rho_s$ | The solid density |
| $v_g$ | Gas velocity |
| $v_s$ | Solids velocity |
| $\epsilon$ | Void fraction |
| r | Radius of pipe |

There are four major components need to be considered in Part I: return leg, crossover pipe, dip leg and SPCV.

Based on the mass balance, the lumped model for return leg can be written as:

$$\frac{d[\rho_s(1-\varepsilon_{out})V]}{dt} = A[\rho_s(1-\varepsilon_{in})v_{s\_in} - \rho_s(1-\varepsilon_{out})v_{s\_out}] \quad (A.1)$$

Please refer to nomenclature for the meaning of the notations. As $m=\rho_s A(1-\epsilon)v_s$, equation (A.1) can be rewritten as:

$$\frac{d\left(\frac{m_s V}{Av_{s\_out}}\right)}{dt} = m_{s\_in} - m_s \quad (A.2)$$

Define $$\tau = \frac{V}{Av_{s\_out}},$$

which is the characteristic time in the pipe. Since the velocity of solid in the return leg do not change too much, then (A.2) can finally be written as:

$$\tau\frac{dm_s}{dt} = m_{s\_in} - m_s \quad (A.3)$$

Suppose in the return leg, the friction constitutes the major contribution to the pressure drop and the effect of suspended solids, the acceleration effects are negligible due to the small air and solid velocities in the pipe. That is $$\Delta P_{re} = \Delta P_{ms} + \Delta P_f \quad (A.4)$$

where $\Delta P_{ms}$ and $\Delta P_f$ represent the pressure drop from the effect of suspended solids and the friction respectively.

Moreover, $\Delta P_{ms}$ can be further written as $$\Delta P_{ms} = \frac{m_s g \tau}{A_{in}} \quad (A.5)$$

The friction consists with two parts. One is the friction between the air and pipe wall, another one is the friction between the air and the solid. Since the air velocity in return leg is very small and does not change too much, it assumes that the pressure drop coming from the friction between the air and pipe wall is almost a constant. Based on the Fanning equation, the pressure drop due to the friction is generally proportional to the square of relative velocity. Considering the air velocity is small and the solid mass flow rate is related to solid velocity, approximately the pressure drop due to the friction can be written as $$\Delta P_f = \alpha m_s^2 + \beta v_g^2 = \alpha m_s^2 + c_f \quad (A.6)$$

From (A.4), we have $$d\Delta P_{re} = \left(\frac{g\tau}{A_{in}} + 2\alpha m_s\right)dm_s \quad (A.7)$$

$$m_s = \frac{\sqrt{\left(\frac{g\tau}{A_{in}}\right)^2 + 4\alpha(\Delta P_{re} - c_f)} - \frac{g\tau}{A_{in}}}{2\alpha} \quad (A.8)$$

Substitute (A.7) and (A.8) to (A.3), we finally arrive at $$\tau\frac{d(\Delta P_{re})}{dt} =$$

$$\sqrt{\left(\frac{g\tau}{A_{in}}\right)^2 + 4\alpha(\Delta P_{re} - c_f)}\left(m_{s\_in} - \frac{\sqrt{\left(\frac{g\tau}{A_{in}}\right)^2 + 4\alpha(\Delta P_{re} - c_f)} - \frac{g\tau}{A_{in}}}{2\alpha}\right)$$

For crossover pipe, the model method can follow the same idea.

For dip leg, there are two important relationships need to be captured. One is the level change of the solids and another one is the pressure drop in the dip leg. The model for the solid level in the dip leg can be built based on the mass balance as follows:

$$\frac{dL}{dt} = \frac{m_{s\_in} - m_{s\_out}}{\rho_s \pi r_d^2 \varepsilon_{dipleg}} \quad (A.10)$$

From the test in the real facility, it is observed that the pressure drop in the dip leg is related with the pressure drop in the riser and proportional to the pressure drop from interconnection to the cyclone. In this reduced order model, an algebra equation is adopted to describe this relationship as shown in (A.11)

$$\Delta P_{dip\_leg} = a(P_{cyclone} - P_2 - \Delta P_{re}) + b \quad (A.11)$$

where a and b are empirical constants to be determined.

The following relationship is used to represent the relationship in the SPCV $$\begin{pmatrix} m_A \\ m_B \\ m_{AtoB} \\ m_{BtoA} \end{pmatrix} = \begin{pmatrix} f_1(F_1, F_2, F_4, F_5, S_1, S_2, S_6, S_7) \\ f_2(F_1, F_2, F_4, F_5, S_1, S_2, S_6, S_7) \\ f_3(F_1, F_2, F_4, F_5, S_1, S_2, S_6, S_7) \\ f_4(F_1, F_2, F_4, F_5, S_1, S_2, S_6, S_7) \end{pmatrix} \quad (A.12)$$

Reduced Order Mathematical Models for Pipeline in Part II

The riser is the most important component in Part II. Unlike the pipeline in part I, the solid velocities are much faster in part II. Therefore, the friction between the air and pipe wall should also be considered in the model.

In the riser, the pressure drop also comes from the suspended solids and the friction. Therefore:

$$\Delta P_{riser} = \Delta P_{ms} + \Delta P_f \quad (A.13)$$

$$\Delta P_{ms} = \frac{m_s g \tau}{A_{in}} \text{ and } \Delta P_f = \alpha m_s^2 + \beta v_g^2 \quad (A.14)$$

From (A.13), it is easy to achieve that $$d\Delta P_{riser} = \left(\frac{g\tau}{A_{in}} + 2\alpha m_s\right)dm_s + 2\beta v_g dv_g \quad (A.15)$$

$$m_s = \frac{\sqrt{\left(\frac{g\tau}{A_{in}}\right)^2 + 4\alpha(\Delta P_{riser} - \beta v_g^2)} - \frac{g\tau}{A_{in}}}{2\alpha} \quad (A.16)$$

Substitute (A.15) and (A.16) into (A.3), the reduced order models for riser can be written as $$\tau\frac{d\Delta P_{riser}}{dt} = 2\alpha v_g \frac{dv_g}{dt} + \sqrt{\left(\frac{g\tau}{A_{in}}\right)^2 + 4\alpha(\Delta P_{riser} - \beta v_g^2)} \quad (A.17)$$

$$\left(m_{s\_in} - \frac{\sqrt{\left(\frac{g\tau}{A_{in}}\right)^2 + 4\alpha(\Delta P_{riser} - \beta v_g^2)} - \frac{g\tau}{A_{in}}}{2\alpha}\right)$$

Suppose the dynamic of the air velocity is fast, therefore, $$\frac{dv_g}{dt}$$

is neglected in the equation. Finally, we arrive at:

$$\tau\frac{d\Delta P_{riser}}{dt} = \sqrt{\left(\frac{g\tau}{A_{in}}\right)^2 + 4\alpha(\Delta P_{riser} - \beta v_g^2)} \tag{A.18}$$

$$\left(m_{s\_in} - \frac{\sqrt{\left(\frac{g\tau}{A_{in}}\right)^2 + 4\alpha(\Delta P_{riser} - \beta v_g^2)} - \frac{g\tau}{A_{in}}}{2\alpha}\right)$$

A linear relationship with the pressure drop in the riser is used to the estimated pressure at the interconnection:

$$P_2 = P_{cyclone} + c\Delta P47 + d \tag{A.19}$$

where c and d are constants to be determined.

In summary, the dynamic reduced order model for chemical looping dual loop process can be written as:

$$\tau\frac{d(\Delta P_{re\_A})}{dt} = \sqrt{\left(\frac{g\tau}{A_{in}}\right)^2 + 4\alpha(\Delta P_{re\_A} - c_f)}$$

$$\left(f_1(u) - \frac{\sqrt{\left(\frac{g\tau}{A_{in}}\right)^2 + 4\alpha(\Delta P_{re\_A} - c_f)} - \frac{g\tau}{A_{in}}}{2\alpha}\right)$$

$$\tau\frac{d(\Delta P_{re\_B})}{dt} = \sqrt{\left(\frac{g\tau}{A_{in}}\right)^2 + 4\alpha(\Delta P_{re\_B} - c_f)}$$

$$\left(f_2(u) - \frac{\sqrt{\left(\frac{g\tau}{A_{in}}\right)^2 + 4\alpha(\Delta P_{re\_B} - c_f)} - \frac{g\tau}{A_{in}}}{2\alpha}\right)$$

$$\tau\frac{d(\Delta P_{AtoB})}{dt} = \sqrt{\left(\frac{g\tau}{A_{in}}\right)^2 + 4\alpha(\Delta P_{AtoB} - c_f)}$$

$$\left(f_3(u) - \frac{\sqrt{\left(\frac{g\tau}{A_{in}}\right)^2 + 4\alpha(\Delta P_{AtoB} - c_f)} - \frac{g\tau}{A_{in}}}{2\alpha}\right)$$

$$\tau\frac{d(\Delta P_{BtoA})}{dt} = \sqrt{\left(\frac{g\tau}{A_{in}}\right)^2 + 4\alpha(\Delta P_{BtoA} - c_f)}$$

$$\left(f_4(u) - \frac{\sqrt{\left(\frac{g\tau}{A_{in}}\right)^2 + 4\alpha(\Delta P_{BtoA} - c_f)} - \frac{g\tau}{A_{in}}}{2\alpha}\right)$$

$$\tau\frac{d\Delta P_{riser\_A}}{dt} = \sqrt{\left(\frac{g\tau}{A_{in}}\right)^2 + 4\alpha(\Delta P_{riser\_A} - \beta v_g^2)}$$

$$\left(m_{riser\_A} - \frac{\sqrt{\left(\frac{g\tau}{A_{in}}\right)^2 + 4\alpha(\Delta P_{riser\_A} - \beta v_g^2)} - \frac{g\tau}{A_{in}}}{2\alpha}\right)$$

$$\tau\frac{d\Delta P_{riser\_B}}{dt} = \sqrt{\left(\frac{g\tau}{A_{in}}\right)^2 + 4\alpha(\Delta P_{riser\_B} - \beta v_g^2)}$$

$$\left(m_{riser\_B} - \frac{\sqrt{\left(\frac{g\tau}{A_{in}}\right)^2 + 4\alpha(\Delta P_{riser\_B} - \beta v_g^2)} - \frac{g\tau}{A_{in}}}{2\alpha}\right)$$

$$\frac{dL_A}{dt} = \frac{m_{L\_A} - f_1(u) - f_3(u)}{\rho_s \pi r_d^2 \varepsilon_{dipleg}}$$

$$\frac{dL_B}{dt} = \frac{m_{L\_B} - f_2(u) - f_4(u)}{\rho_s \pi r_d^2 \varepsilon_{dipleg}}$$

where u are control inputs of the system and they are the airflow blown into SPCV, and $$m_{riser\_A} = \frac{\sqrt{\left(\frac{g\tau}{A_{in}}\right)^2 + 4\alpha(\Delta P_{re\_A} - c_f)} - \frac{g\tau}{A_{in}}}{2\alpha} + \frac{\sqrt{\left(\frac{g\tau}{A_{in}}\right)^2 + 4\alpha(\Delta P_{BtoA} - c_f)} - \frac{g\tau}{A_{in}}}{2\alpha},$$

$$m_{riser\_B} = \frac{\sqrt{\left(\frac{g\tau}{A_{in}}\right)^2 + 4\alpha(\Delta P_{re\_B} - c_f)} - \frac{g\tau}{A_{in}}}{2\alpha} + \frac{\sqrt{\left(\frac{g\tau}{A_{in}}\right)^2 + 4\alpha(\Delta P_{AtoB} - c_f)} - \frac{g\tau}{A_{in}}}{2\alpha},$$

$$m_{L\_A} = \frac{\sqrt{\left(\frac{g\tau}{A_{in}}\right)^2 + 4\alpha(\Delta P_{riser\_A} - \beta v_g^2)} - \frac{g\tau}{A_{in}}}{2\alpha}$$

$$m_{L\_B} = \frac{\sqrt{\left(\frac{g\tau}{A_{in}}\right)^2 + 4\alpha(\Delta P_{riser\_B} - \beta v_g^2)} - \frac{g\tau}{A_{in}}}{2\alpha}$$

There are total 8 final ODE equations that will be used to define this ROM.

Constraint Handling

The design of constraints has a big effect in control of the chemical looping process. There are two kinds of constraints.

One is "hard constraint", which cannot be violated during the whole process operation. The active hard constraint can introduce extra feedback terms in the NMPC controller. This can lead to instability of the constrained closed-loop system with certain active sets, and it is independent of the choice of tuning parameters. In chemical looping process, the hard constraints include the minimum blown airflow rate to generate the solid flow out of SPCV, the maximum airflow rate due to the physical design, the minimum solid level in dip leg to keep the pressure seal and the maximum solid mass flow in riser.

The other is "soft constraint", which can be violated in the process but will add a penalty to the cost function. The soft constraints in chemical looping process include the variation of solid level within an acceptable range around a desired level, the acceptable operation range of airflow and the acceptable fluctuations for pressure drops above and blow the desired operating points.

Elimination of Steady-State Offset with Plant/Model Mismatch

There is always a mismatch between the plant and the ROM. In reality, this mismatch can lead to steady-state errors in NMPC control. To avoid this difficulty, the control loop must include an integrator element to eliminate the steady state offset. In design NMPC for chemical looping process, since the pressure drop in riser is important and it requires an accurate control, therefore, an integrator for the pressure drop in riser can be added directly to the nonlinear ROM to eliminate the steady state offset coming from plant/model mismatch.

Alternative Embodiments

This Invention Can Be Used in:
1. Design model-based control for chemical unit involving chemical and thermal production and two-phase flow transportation, e.g., Circulating Fluidized Bed and Chemical Looping process.
2. Chemical unit simulation to support control design and control tuning.
3. Process and performance optimization in two-phase flow chemical unit.

In an embodiment, a method is disclosed herein for optimizing operation of a chemical looping plant having loops A and B, each having a riser for carrying solid particles entrained in air/gas upward then through a horizontal upper pipeline to a separation unit adapted for separating the solid particles from the fluid, the separation unit provides the solid particles downward through a dip leg to a seal pot, and the seal pot selectively sending the solid particles either to the opposite loop through a crossover pipe or through a return leg to a lower pipeline at an interconnection point, the fluid is introduced into the lower pipeline blowing the solid particles up the lower pipeline and back through the riser. The method comprises the steps of creating a reduced order model ("ROM") by: creating mass balance equations employing terms for pressure, pressure drop, mass flow, acceleration of air and particles for each of the riser, dip leg and return leg; deleting pressure drop terms for the return leg other than those defining friction; deleting acceleration terms in the return leg; setting the return leg pressure drop due to friction to a constant; providing various inputs (ui) to the ROM and monitoring outputs (yi) of the ROM to determine optimum settings for the chemical looping plant; and providing the optimum settings to the chemical looping plant to result in optimum operation of the chemical looping plant.

In a more specific embodiment, a non-linear optimizer interacts with the ROM to provide various input values (ui) to the ROM and monitors the output (yi) of ROM to determine the optimum input settings (ui).

In another embodiment, a controller system for optimizing operation of a chemical looping plant having a loop A and loop B is described. The system comprises: a non-linear model predictive controller ("NMPC") adapted to: receive a plurality of user setpoints, pressure measurements, solid mass flows and solid levels of both loops A and B;
create optimum signals for the seal pots (F1/F2, F4/F5, S1/S2, S4/S5) and vacuum pumps/induction fan (Pump A, Pump B) for loops A and B; provide the signals (F1/F2, F4/F5) to control seal pot valves and a vacuum pump/induction fan (Pump A) to loop A;
provide the calculated settings to control seal pot valves (S1/S2, S4/S5) and a vacuum pump/induction fan (pump B) to loop B; an observer adapted to: receive pressure and differential pressure measurements from loops A and B; calculate solids mass flow and solids levels in loops A and B, and provide the solids mass flow and solids levels of loops A and B to the NMPC.

In a more specific embodiment, the user setpoints are differential pressures of loop A (DP47) and of loop B (DP47b), F2, F2b, and a ratio of differential pressure in loop A to the total pressure difference of both loops A and B (DP12/(DP12+DP12b)).

In another embodiment, a controller system for optimizing operation of a chemical looping plant having a loop A and loop B is disclosed. The system comprises:
a non-linear model predictive controller ("NMPC") adapted to: receive a plurality of user setpoints, pressure measurements, solid mass flows and solid levels of both loops A and B;
create optimum signals (F1/F2, F4/F5, S1/S2, S6/S7) for the seal pots and (Pump A, Pump B) for vacuum pumps/ID fans of loops A and B; provide the signals (F1/F2, F4/F5) to control seal pot valves and (Pump A) to vacuum pump/ID fan of loop A; provide the signals (S1/S2, S6/S7) to control seal pot valves and (Pump B) to vacuum pump/ID fan of loop B; an observer adapted to: receive pressure and differential pressure measurements from loops A and B; calculate solids mass flows in loops A and B, and provide the solids mass flows of loops A and B to NMPC.

In a more specific embodiment, the user setpoints are DP47, DP47b, F2, F2b, and DP12/(DP12+DP12b).

In another embodiment, a controller system for optimizing operation of a chemical looping plant having a loop A and a loop B is described. The system comprises:
a non-linear model predictive controller ("NMPC") adapted to: receive a plurality of user setpoints, values of a plurality of internal state variables of both loops A and B; create optimum signals (F1/F2, F4/F5, S1/S2, S6/S7) for the seal pots and (Pump A, Pump B) for vacuum pumps/ID fans of loops A and B; provide the signals (F1/F2, F4/F5) to control seal pot valves and (Pump A) to vacuum pump/ID fan of loop A; provide the signals (S1/S2, S6/S7) to control seal pot valves and (Pump B) to vacuum pump/ID fan of loop B; wherein loop A provides values of its internal state variables to NMPC; and loop B provides values of its internal state variables to NMPC.

In a more specific embodiment, the user setpoints are solid mass flow rates in loop A (msA), in loop B (msB), the solid mass flow from loop A to loop B (msAtoB), the solid mass flow from loop B to loop A (msBtoA) and solids level at diplegs Lds.

In another embodiment, a Neural Network (NN) controller system for optimizing operation of a chemical looping plant having a loop A and a loop B is disclosed. The system comprises: a neural network non-linear model predictive controller ("NN NMPC") adapted to: receive differential pressures of loop A (DP47) and differential pressure of loop B (DP47B); create optimum signals for seal pot valves of loop A (F1/F2), and seal pot valves of loop B (S1/S2) for vacuum pumps/ID fans of loops A and B; provide the signals (F1/F2) and (S1/S2) to control seal pot valves of loops A and B, respectively; provide the signals (S1/S2, S6/S7) to control seal pot valves and (Pump B) to vacuum pump/ID fan of loop B; a difference device adapted to receive a pressure (P2A) from loop A and a pressure (P2B) from loop B and create a pressure difference signal (DP6); a PID2 coupled to the difference device to receive the pressure difference signal (DP6) and create a signal (PumpB) to run air pumps of loop B; a ratio device adapted to receive a differential pressure (DP12A) from loop A and (DP12B) from loop B and to create a signal related to the ratio of inputs (DP12 Ratio); a PID1 coupled to the ratio device adapted to receive the signal (DP12 Ratio) and create a signal (S6/S7) operating the seal pot valves of loop B; a load-based FF controller that creates a signals W1 that is provided to loop A, and W3 that is provided to loop B; and wherein loop A provides signals (P2A), (DP12A) and (DP47A) to difference device, ratio device, and NN NMPC, respectively; and loop B provides signals (P2B), (DP12B) and (DP47B) to difference device, ratio device and NN NMPC, respectively.

In another embodiment, a method optimizing operation of a chemical looping plant having a fuel reactor loop and an air reactor is disclosed, wherein the fuel reactor loop having a fuel reactor for carrying solid particles entrained in air/gas upward then through a horizontal upper pipeline to a first separation unit adapted for separating the solid particles from the fluid, the separation unit providing the solid particles downward through a primary dip leg to a first seal pot, the first seal pot sending the solid particles to the fuel reactor through a return leg, the fuel reactor operatively associated with a second seal pot, the second seal pot selectively sending the particles to either to an air reactor loop through a crossover pipe or transported up the fuel reactor; and the air reactor loop having an air reactor for carrying solid particles entrained in air/gas upward then through a horizontal upper pipeline to a separation unit adapted for separating the solid particles from the fluid, the separation unit providing the solid particles downward through a dip leg to a third seal pot and a fourth seal pot, the third seal pot selectively sending the solid particles to the air reactor through a return pipe, the fourth seal pot selectively sending the particles to the fuel reactor loop through a crossover pipe. The method comprises the steps of: creating a reduced order model ("ROM") by: creating mass balance equations employing terms for pressure, pressure drop, mass flow, acceleration of air and particles for each of the reactors, dip legs and return leg; deleting pressure drop terms for the return leg other than those defining friction; deleting acceleration terms in the return leg; setting the return leg pressure drop due to friction to a constant; providing inputs (ui) to the ROM and monitoring outputs (yi) of the ROM to determine optimum settings for the chemical looping plant; and providing the optimum settings to the chemical looping plant to result in optimum operation of the chemical looping plant.

In a more specific embodiment a non-linear optimizer interacts with the ROM to provide various input values (ui) to the ROM and monitors the output (yi) of ROM to determine the optimum input settings (ui).

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A controller system for optimizing operation of a chemical looping plant having a loop A and a loop B, each of the loop A and the Loop B having respective seal pot valves, and a respective pressure control device, the system comprising:
a non-linear model predictive controller ("NMPC") adapted to:
receive a plurality of user setpoints, pressure measurements, solid mass flows and solid levels of both loops A and B;
create respective optimum signals for the respective seal pot valves of loop A;
create respective optimum signals for the respective pressure control device of loop A;
create respective optimum signals for the respective seal pot valves of loop B;
create respective optimum signals for the respective pressure control device of loop B
provide to loop A the respective optimum signals for the respective seal pot valves of loop A, and respective optimum signals for the respective pressure control device of loop A, to control the respective seal pot valves and the respective pressure control device of loop A;
provide to loop B the respective optimum signals for the respective seal pot valves of loop B, and respective optimum signals for the respective pressure control device of loop B, to control the respective seal pot valves and respective pressure control device of loop B;
an observer adapted to:
receive pressure and differential pressure measurements from loops A and B;
calculate solids mass flow and solids levels in loops A and B, and
provide the calculated solids mass flow and solids levels of loops A and B to the NMPC.

2. The controller system of claim 1, wherein the user setpoints are differential pressures of loop A, and differential pressures of loop B, and a ratio of differential pressure in loop A to the sum of the differential pressures of both loops A and B.

3. A controller system for optimizing operation of a chemical looping plant having a loop A and a loop B, each of the loop A and the loop B having a respective seal pot valve, and a respective pressure control device, the system comprising:
a non-linear model predictive controller ("NMPC") adapted to:
receive a plurality of user setpoints, pressure measurements, solid mass flows and solid levels of both loops A and B;
create respective optimum signals for the respective seal pot valve of loop A;
create respective optimum signals for the respective pressure control device of loop A;
create respective optimum signals for the respective seal pot valve of loop B;
create respective optimum signals for the respective pressure control device of loop B;
provide to loop A the respective optimum signals for the respective seal pot valve of loop A, and respective optimum signals for the respective pressure control device of loop A, to control the respective seal pot valve and the respective pressure control device of loop A;
provide to loop B the respective optimum signals for the respective seal pot valve of loop B, and respective optimum signals for the respective pressure control device of loop B, to control the respective seal pot valve and respective pressure control device of loop B;
an observer adapted to:
receive pressure and differential pressure measurements from loops A and B;
calculate solids mass flows of loops A and B, and provide the calculated solids mass flows of loops A and B to the NMPC.

4. The controller system of claim 3, wherein the user setpoints are the differential pressures of loop A and of loop B, and a ratio of differential pressure in loop A to the total pressure difference of both loops A and B.

5. A Neural Network (NN) controller system for optimizing operation of a chemical looping plant having a loop A and a loop B, each of the loop A and the loop B having a respective seal pot valve, and a respective pressure control device, the system comprising:
- a neural network non-linear model predictive controller ("NN NMPC") adapted to:
  - receive a differential pressure signal of loop A and a differential pressure signal of loop B;
  - create respective optimum signals for the seal pot valve of loop A;
  - create respective optimum signals for the seal pot valve of loop B;
  - create respective optimum signals for the respective pressure control device of loop A;
  - create respective optimum signals for the respective pressure control device of loop B;
  - provide to loop A the respective optimum signals for the respective seal pot valve of loop A, and the respective optimum signals for the respective pressure control device of loop A, to control the respective seal pot valve and respective pressure control device of loop A;
  - provide to loop B the respective optimum signals for the respective seal pot valve of loop B, and the respective optimum signals for the respective pressure control device of loop A, to control the respective seal pot valve and respective pressure control device of loop B;
- a difference device adapted to receive a pressure signal from loop A, and a pressure signal from loop B, and to create a pressure difference signal;
- a PID2 coupled to the difference device to receive the pressure difference signal and to create a signal to run the respective pressure control device of loop B;
- a ratio device adapted to receive a respective differential pressure signal from each of loop A and from loop B, respectively, and to create a signal related to the ratio of the respective differential pressure signals received from loop A and loop B;
- a PID1 coupled to the ratio device adapted to receive the signal related to the ratio of inputs and to create a signal for operating the respective seal pot valves of loop B;
- a load-based FF controller that creates a first signal that is provided to loop A, and a second signal that is provided to loop B; and
- wherein loop A provides the pressure signal, the respective differential pressure signal, and the differential pressure signal to the difference device, the ratio device, and the NN NMPC, respectively; and
- wherein loop B provides the pressure signal, the differential pressure signal, and the differential pressure signal to the difference device, the ratio device and the NN NMPC, respectively.

* * * * *